United States Patent Office 3,391,202
Patented July 2, 1968

3,391,202
7,7 - DI(FLUOROALKYL) - 1,3,5 - CYCLOHEPTA-
TRIENES AND 2,2 - BIS(FLUOROALKYL) - BI-
CYCLO[3.2.0]-3,6-HEPTADIENES
David M. Gale, Wilmington, Del., assignor to E. I. du
Pont de Nemours and Company, Wilmington, Del., a
corporation of Delaware
No Drawing. Filed Jan. 12, 1966, Ser. No. 520,100
4 Claims. (Cl. 260—648)

ABSTRACT OF THE DISCLOSURE

Novel 7,7-di(fluoroalkyl)-1,3,5-cycloheptatrienes and 2,2 - bis(fluoroalkyl)bicyclo[3.2.0] - 3,6-heptadienes are prepared. The 2,2-bis(fluoroalkyl)bicyclo[3.2.0]-3,6-heptadienes are formed by the reaction of bis(fluoroalkyl)-diazomethane and an aromatic compound irradiated with actinic radiation at temperatures of −50° to 75° C. and the 1,3,5-cycloheptatrienes are formed by heating the reaction mixture at a temperature of 100–300° C. The 1,3,5-cycloheptatrienes are useful as solvents for waterproof coatings and both classes of the compounds are useful as silicone oil gelling agents.

This invention relates to perfluoroalkyl substituted 1,3,5-cycloheptatrienes and perfluoroalkyl substituted bicyclo-[3.2.0]-3,6-heptadienes and to the processes for their preparation.

More specifically, this invention relates to 7,7-bis(fluorinated alkyl)-1,3,5-cycloheptatriene represented by Formula I, and 2,2-bis(fluorinated alkyl)-bicyclo[3.2.0]-3,6-heptadiene represented by Formula II

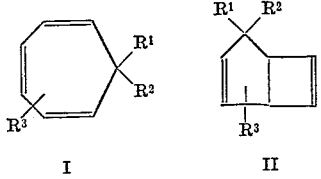

I                II wherein $R^1$ and $R^2$ taken separately can be the same or different and represent perfluoroalkyl, ω-hydroperfluoroalkyl or ω-chloroperfluoroalkyl wherein said alkyl groups contain 1 to 8 carbon atoms and $R^3$ is a member selected from the class consisting of hydrogen, chlorine and alkyl containing 1 to 6 carbon atoms.

It has been found that the 1,3,5-cycloheptatrienes of this invention are formed by the reaction of bis(perfluorinated alkyl)diazomethane with aromatic and substituted aromatic hydrocarbons at temperatures of 100 to 300° C. It has further been found that a mixture of the 7,7-bis(perfluoro alkyl)-1,3,5-cycloheptatriene and 2,2-bis(perfluoro alkyl) - bicyclo[3.2.0] - 3,6 - heptadiene are formed when a mixture of bis(perfluorinated alkyl)diazomethane and an aromatic compound is irradiated with actinic radiation at temperatures of −50° to 75° C.

The compounds of this invention are interconvertible. Thus, 1,3,5-cycloheptatrienes (I) can be converted photolytically into bicyclo[3.2.0]-3,6-heptadienes (II) by means of actinic radiation and bicyclo[3.2.0]-3,6-heptadienes (II) can be thermally converted into perfluoroalkyl substituted 1,3,5-cycloheptatrienes (I). This interconversion is illustrated by the following equation.

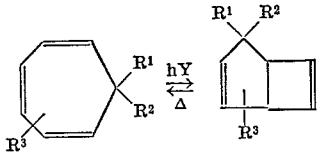

wherein $R^1$, $R^2$ and $R^3$ are the same as described above.

The thermal reaction (Δ) is carried out at temperatures of 100–300° C. with temperatures of 150–250° C. usually employed. The photolytic reaction (hν) is carried out by the use of actinic radiation for 10 to 100 hours at temperatures of −80° C. to 100° C. The actinic radiation used for the interconversion is that which is capable of causing diazomethanes to evolve nitrogen. Radiation of this type emanates from commercially available ultraviolet light sources.

It is believed that the reaction of the diazomethane and aromatic compounds occurs by the addition of the carbene [$R^1R^2C$:] which is produced by the decomposition of diazomethanes. Nitrogen is formed as a product of the decomposition. The addition of the carbene to the aromatic compound can occur at any of the aromatic double bonds. Therefore, a mixture of position isomeric products is obtained when the reaction is conducted with substituted aromatic compounds. The mixture consists of substituted 7,7 - (fluorinated alkyl) - 1,3,5-cycloheptatrienes wherein the substituent is found at all but the 7-position. Likewise, the isomerization of a substituted 7,7-(fluorinated alkyl)-1,3,5-cycloheptatrienes produces a mixture of substituted 2,2-(fluorinated alkyl)-bicyclo[3.2.0]-3,6-heptadienes wherein the substituent is found at all but the 2-position.

The compounds of this invention are produced by mixing the desired aromatic compound and diazomethane together in any proportion (although a 1 to 50 molar excess of aromatic is usually employed) and irradiating the mixture with actinic radiation which causes the diazo compound to evolve nitrogen (such radiation emanates from common ultraviolet light sources) at a temperature of −80° to 100° C. The 1,3,5-cycloheptatrienes are produced by heating the bicycloheptadienes or mixtures of the bicycloheptadienes and cycloheptatrienes at a temperature greater than 100° C., however, a temperature of 150° to 200° C. is usually used. The thermal and photolytic steps may be combined in any order depending on which products are most desired. The photolysis as the sole or major (usually last and for longer durations) step gives good yields of bicyclo[3.2.0]-3,6-heptadiene while thermolysis as the sole or major step gives good yields of 1,3,5-cycloheptatrienes.

The products are isolated by ordinary means, for example, by distillation. Time and pressure required to effect the reaction are not critical. The time and pressure used is determined by taking into consideration the stability of the reactants and products. It is preferred that the photolytic process be carried out at atmospheric pressure for the time necessary for the diazomethane compound to evolve one equivalent of nitrogen gas, generally 24 to 96 hours, and that the thermal process be carried out in an autoclave at autogenous pressure generally for 8 to 24 hours. An inert solvent such as 1,1,2-trichloroethane can be employed as a reaction medium.

The aromatic moiety of the above reaction can be benzene and substituted aromatic compounds, such as toluene, ethylbenzene, cumene, butylbenzene, hexylbenzene, and chlorobenzene.

The bis(fluorinated alkyl)-, bis(ω-haloperfluorinated alkyl)- and bis(ω-hydroperfluorinated alkyl)diazomethanes used in the processes of this invention are represented by the formula $R^1R^2CN_2$, wherein $R^1$ and $R^2$ are fluorinated alkyl or alkylene groups described above. Examples of these diazomethanes are: bis(1,1,2,2-tetrafluoroethyl)-diazomethane, bis(2-chloro-1,1,2,2,-tetrafluoroethyl) - diazomethane, bis(trifluoromethyl)diazomethane, bis(pentafluoroethyl)diazomethane, chlorodifluoromethyltridecafluorohexyldiazomethane, and bis(chlorodifluoromethyl)diazomethane.

The diazomethane compounds used herein can be prepared by oxidation of the corresponding hydrazones, preferably with lead tetraacetate in a carbonitrile solvent as described in the copending application of Carl G. Krespan and William J. Middleton, Serial No. 459,120, filed May 26, 1965, now Patent No. 3,242,166.

In order that the invention may be better understood, the following detailed examples are given.

EXAMPLE I

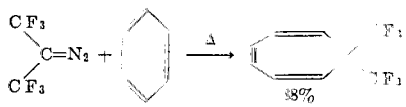

A 4.8 ml. (6.5 g.) sample of bis(trifluoromethyl)diazomethane was distilled into 50 ml. of dry benzene in a 240 ml. "Hastelloy" tube and heated at 200° C. for 8 hours. The recovered colorless solution (46 g.) was shown to contain, in addition to a large volume of benzene, at least two products (by gas chromatographic analysis on a silicone grease column at 67° C.). Distillation gave 6.05 g. (70%) of product, B.P. 132–141° C. Upon fractionation, a fraction was obtained, B.P. 141° C., $n_D^{25}$ 1.4062, in about 62% yield which was shown to be 7,7-bis(trifluoromethyl)-1,3,5-cycloheptatriene by spectral data and analysis. An essentially pure sample of the 1,3,5-cycloheptatriene was obtained by fractionation.

Spectral data of 7,7-bis(trifluoromethyl)-1,3,5-cycloheptatriene

Infrared absorption: peaks 3045 cm.$^{-1}$(=CH) and no peak corresponding to C—H and —CF$_3$ absorption.

Ultraviolet absorption: $\lambda_{max}$=276 ($\epsilon$=3,200).

Mass spectrum: parent peak at m/e=228 and required fragments.

Fluorine-19 magnetic resonance: NMR—singlet at +249 c.p.s. at —140° to +140° (external standard—Cl$_2$CFCCl$_2$F).

Proton magnetic resonance: multiplet (area 4) at $\tau$=3.6; multiplet (area 2) at $\tau$=4.6.

Raman spectrum: 3050 (36), 2985 (8), 1620 (25), 1565 (100), 1450 (8), 1280 (5), 1225 (19), 965 (16), 740 (9), 580 (7), 475 (6), 430 (11) cm.$^{-1}$.

Analysis.—Calc'd for C$_9$H$_6$F$_6$ (228.14): C, 47.39; H, 2.65; F, 49.98. Found: C, 47.85; H, 2.92; F, 49.90.

EXAMPLE II

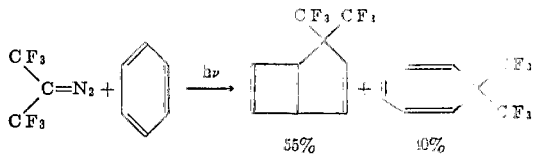

A 4.0-ml. (5.6 g.) sample of bis(trifluoromethyl)-diazomethane was photolyzed for 40 hours with a G.E. H85A3 lamp through Pyrex in the presence of 40 ml. of dry benzene. The temperature of the reaction mixture was maintained at 25° C. or less. The product (2 g.) was isolated by distillation. This product was separated using a preparative gas chromatograph and identified as 55% 2,2-bis(trifluoromethyl)-bicyclo[3.2.0] - 3,6 - heptadiene, and 40% 7,7-bis(trifluoromethyl)-1,3,5-cycloheptatriene. The bicyclo[3.2.0]-3,6-heptadiene, B.P. 139° C., was identified by the following analysis and spectral data.

Spectral data for

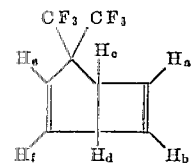

Infrared absorption: peaks 1565 cm.$^{-1}$ (cyclobutene); 1618 cm.$^{-1}$ (cyclopentene); 3180 and 3080 cm.$^{-1}$ =CH); 2950 cm.$^{-1}$ (sat. —C—H).

Ultraviolet absorption: maximum extinction coefficient was less than 30.

Mass spectrum: parent peak at 228 and fragments.

Proton magnetic: $\tau$=3.58 (Ha), 3.95 (Hb), Jab=2.5 c.p.s.; $\gamma$=6.12 (Hc), 6.27 (Hd), Jcd=0 c.p.s.; $\gamma$=3.58 (He), 4.48 (Hf), Jef=6 c.p.s.

Ha and Hb were decoupled to solve the difficulty caused by the overlap of Ha and He; when Hb was decoupled from Ha, it changed from two lines to one. All other J-values were close to zero. F$^{19}$NMR: a pair of quartets (J=9.5) at —65 and +336 c.p.s. from external Cl$_2$FCCCl$_2$F the low field quartet split further.

Analysis.—Calc'd for C$_9$H$_6$F$_6$ (228.14): C, 47.39; H, 2.65; F, 49.98. Found: C, 47.77; H, 2.92; F, 50.66.

EXAMPLE III

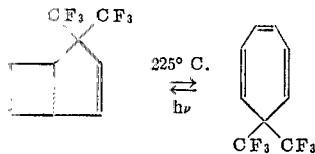

The above interconversion was demonstrated directly. The diene gave 70% conversion to the 1,3,5-cycloheptatriene when heated to 225° C. for 5 hours and 89% conversion when heated at 225° C. for 12 hours. 1,3,5-cycloheptatriene gave 10% conversion to the bicyclo[3.2.0]heptadiene in 16 hours and 97% conversion in 72 hours when irradiated with a G.E. H85A3 lamp. Products were identified by gas chromatographic retention times and infrared analysis.

EXAMPLE IV

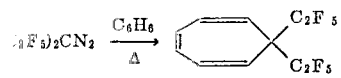

A mixture of 45 ml. of benzene and 2.8 ml. (4.7 g.) of bis(pentafluoroethyl)diazomethane was heated in a "Hastelloy" tube at 150° C. for 8 hours. Distillation gave 1.3 g. (20%), B.P. 42° C./5 mm. Hg, $n_D^{25}$ 1.3886, of 7,7-bis(pentafluoroethyl)-1,3,5-cycloheptatriene. The H$^1$ NMR spectrum showed a multiplet at $\tau$=3.67 (area 4) and at $\tau$=4.5 (area 2). The F$^{19}$ NMR indicated a multiplet at +613 (area 3) and +2884 (area 2) c.p.s. from external CCl$_2$FCCl$_2$F.

Analysis.—Calc'd for C$_{11}$H$_6$F$_{10}$: C, 40.25; H, 1.83; F, 57.90. Found: C, 39.87; H, 2.09; F, 57.83.

When the diazomethanes and aromatic compounds of Table I are reacted according to the procedure of Example I or Example II, the products in the right-hand column of Table I are obtained.

TABLE I

| Diazomethane Compound | Aromatic Compound | Reaction Conditions | Product(s) |
|---|---|---|---|
| (1) Chlorodifluoromethyl-ω-hydroperfluoropentyl-diazomethane. | Hexylbenzene | Example I | 7-(chlorodifluoromethyl)-7-(ω-hydroperfluoropentyl)-hexyl-1,3,5-cycloheptatriene. |
| (2) Chlorodifluoromethyl-tridecafluorohexyl-diazomethane. | Chlorobenzene | Example II | 7-(chlorodifluoromethyl)-7-(tridecafluorohexyl)-chloro-1,3,5-cycloheptatriene and 2-(chlorodifluoromethyl)-2-tridecafluorohexyl)chloro-bicyclo[3.2.0]-3,6-heptadiene. |
| (3) 2-chloro-1,1,2,2-tetra-fluoroethyltrifluoromethyl-diazomethane. | Benzene | Example II | 7-(2-chloro-1,1,2,2-tetrafluoro-ethyl)-7-(trifluoromethyl)-1,3,5-cycloheptatriene and 2-(2-chloro-1,1,2,2-tetrafluoroethyl)-2-(trifluoromethyl)bicyclo-[3.2.0]-3,6-heptadiene. |

The 1,3,5-cycloheptatrienes of this invention are useful as solvents for water-proof coatings. The following example illustrates this use.

EXAMPLE V

A sample of polytetrafluoroethylene wax (M.P. ca. 83–145° C.) was dissolved in 7,7-bis(trifluoromethyl)-1,3,5-cycloheptatriene. The resulting solution was poured onto a piece of untreated filter paper. The solvent was removed with a warm air stream. The coated portion of the paper was water repellent when placed in water. The uncoated portion was not water repellent and wetted immediately.

The compounds of this invention are useful as silicone gelling agents. The following example illustrates this use.

EXAMPLE VI

To a 50-ml. sample of G.E. SF–96 (100) silicone fluid heated at 230° C. was added a 3 mg. mixture of 70% 7,7-bis(trifluoromethyl)-1,3,5-cycloheptatrien—30% 2,2-bis(trifluoromethyl)bicyclo[3.2.0]-3,6-heptadiene. Heating was continued for 10 hours. The silicone oil gelled on cooling. The silicone fluid heated alone for 10 hours at 230° C. was not gelled on cooling.

The foregoing detailed description has been given for clearness of understanding only and no unnecessary limitations are to be understood therefrom. The invention is not limited to the exact details shown and described since obvious modifications will occur to those skilled in the art.

The embodiments of the invention in which an exclusive property or privilege is claimed are defined as follows:

1. Compounds selected from the group consisting of

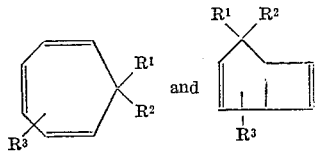

and wherein $R^1$ and $R^2$ taken separately can be the same or different and each represents perfluoroalkyl, ω-hydroperfluoroalkyl or ω-chloroperfluoroalkyl wherein said alkyl groups contain 1 to 8 carbon atoms and $R^3$ is a member selected from the class consisting of hydrogen, chlorine and alkyl containing 1 to 6 carbon atoms.

2. Compounds of claim 1 wherein $R^1$ and $R^2$ are trifluoromethyl and $R^3$ is hydrogen, said compounds being 7,7-bis(trifluoromethyl)-1,3,5-cycloheptatriene and 2,2-bis(trifluoromethyl(bicyclo[3.2.0]-3,6-heptadiene.

3. Compounds of claim 1 wherein $R^1$ and $R^2$ are perfluoroalkyl groups containing 1 to 8 carbon atoms.

4. The compound of claim 1 of the formula

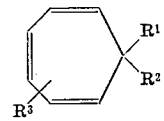

wherein $R^1$ and $R^2$ are pentafluoroethyl and $R^3$ is hydrogen; said compound being 7,7-bis(pentafluoroethyl)-1,3,5-cycloheptatriene.

References Cited

Kirmse, Carbene Chemistry, pp. 34 and 35 (1964).
Srinivasan, J. Am. Chem. Soc., pp. 3432 to 3436 (1962).
Gale et al., J. Am. Chem. Soc., vol. 87, p. 657 (1965).
Muller et al., Tetrahedron Letters, vol. 22, p. 1501 (1963).

BERNARD HELFIN, *Acting Primary Examiner.*

LEON ZITVER, *Examiner.*

M. JACOB, *Assistant Examiner.*